(12) United States Patent  
Ishizaka

(10) Patent No.: US 9,321,411 B2  
(45) Date of Patent: Apr. 26, 2016

(54) INTERIOR PART FOR VEHICLE

(75) Inventor: Keita Ishizaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 14/000,718

(22) PCT Filed: Jan. 19, 2012

(86) PCT No.: PCT/JP2012/051054  
§ 371 (c)(1),  
(2), (4) Date: Aug. 21, 2013

(87) PCT Pub. No.: WO2012/117760  
PCT Pub. Date: Sep. 7, 2012

(65) Prior Publication Data  
US 2013/0328338 A1    Dec. 12, 2013

(30) Foreign Application Priority Data

Feb. 28, 2011    (JP) .................................. 2011-041759

(51) Int. Cl.  
*B60R 13/02*    (2006.01)  
*B60N 2/46*    (2006.01)

(52) U.S. Cl.  
CPC .............. *B60R 13/02* (2013.01); *B60N 2/4666* (2013.01); *B60R 13/0243* (2013.01)

(58) Field of Classification Search  
CPC ......................... B60R 13/02–13/0275; B60R 2013/0281–2013/0293; B60R 21/0428; B60N 2/4666; B60N 2/4686  
USPC .................................................. 296/1.08, 153  
See application file for complete search history.

(56) References Cited

U.S. PATENT DOCUMENTS

| 5,339,676 A * | 8/1994 | Johnson ............................ 73/40 |
| 6,713,029 B1 * | 3/2004 | Krafft et al. ................... 422/300 |
| 2004/0178660 A1 * | 9/2004 | Dry ..................... B29C 45/1675 296/153 |

FOREIGN PATENT DOCUMENTS

| JP | 08-183406 A | 7/1996 |
| JP | 2009-269414 A | 11/2009 |

* cited by examiner

*Primary Examiner* — Glenn Dayoan  
*Assistant Examiner* — Paul Chenevert  
(74) *Attorney, Agent, or Firm* — Carrier Blackman & Associates, P.C.; William D. Blackman; Anne G. Sabourin

(57) ABSTRACT

An interior part (13) for a vehicle is attached to the inner panel (31) of a door (12). The interior part (13) has: a fastening hole (43) formed in order to allow a screw part (42) which is used to fasten the interior part (13) to the inner panel (31) to be passed therethrough; a tray section (44) formed below the fastening hole (43); and an opening (45) formed in the tray section (44) in a size which does not permit the screw part (43) to pass through the opening (45).

5 Claims, 7 Drawing Sheets

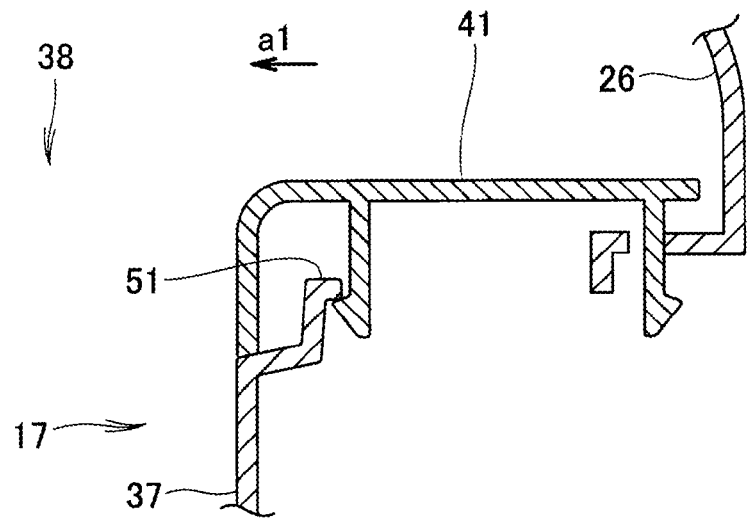
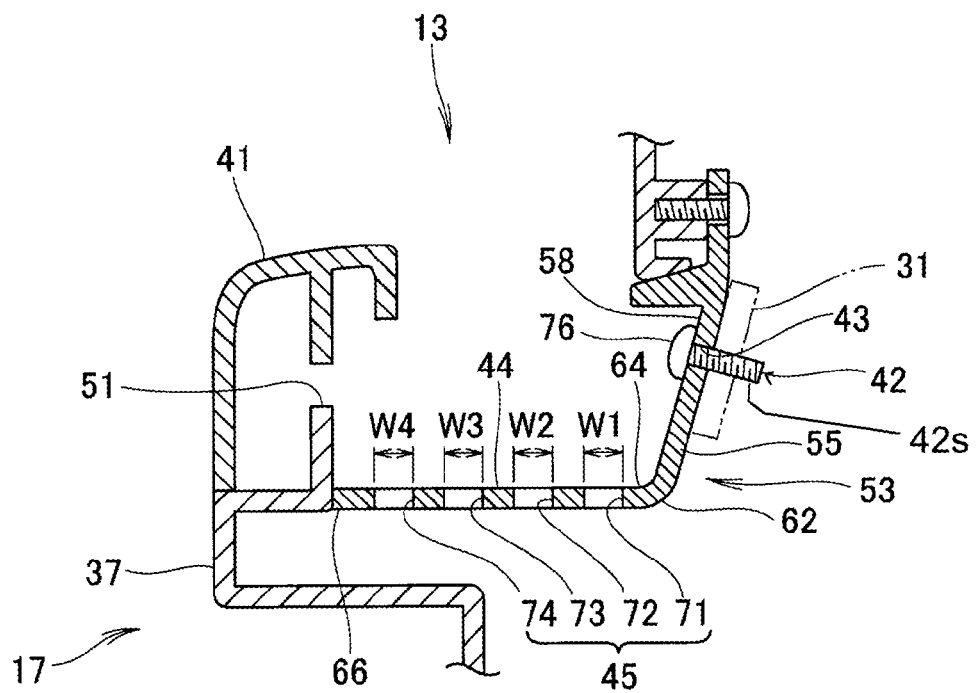

us 9,321,411 B2

INTERIOR PART FOR VEHICLE

TECHNICAL FIELD

The present invention relates to an interior part provided in a passenger compartment of a vehicle.

BACKGROUND ART

An interior part for a vehicle, mounted on an armrest of a door, is known, as disclosed in Patent Literature 1. The interior part is a pocket wherein sundries can be put. The interior part is inserted through an opening of a door lining that serves as an interior decoration of a passenger compartment, with an edge of the interior part being engaged with the door lining Further, since the interior part is fastened at a lower part to the door lining by a screw member, the interior part achieves reduction in the number of components can be attached with reduced man-hours.

However, in the interior part disclosed in Patent Literature 1, upon fastening of the lower or bottom portion of the interior part by the screw member using a fastening tool, it is likely that one will drop the screw member inadvertently down to an inside bottom of the door. Once the screw member is dropped, it is tedious and time consuming to get the screw member back.

PRIOR ART LITERATURE

Patent Literature

Patent Literature 1: Japanese Patent Laid-Open Publication No. H08-183406 A

SUMMARY OF INVENTION

Technical Problem

It is therefore an object of the present invention to provide an interior part for a vehicle, which is capable of: receiving or catching a screw part dropped inadvertently into the interior part during assemblage of the interior part via a screw part; preventing water dropped to a vicinity of the interior part and entered into a tray portion of the interior part from collecting in the tray portion; and absorbing an impact applied from outside the vehicle exterior by being rendered collapsible.

Solution to the Problem

According to a first aspect the present invention, there is provided an interior part for a vehicle, adapted to be attached to a fixation portion of a vehicle body, which comprises: a screw part for fastening the interior part to the fixation portion; a fastening hole formed therein to permit passage of a part of the screw part therethrough; a tray section formed below the fastening hole; and an opening formed in the tray section to have a size smaller than the screw part so as not to allow passage of the screw part therethrough.

The opening, according to a second aspect of the invention, may comprise a plurality of openings.

Advantageous Effects of Invention

In the first aspect of the invention, when a screw part is inadvertently dropped off from a tool or through a fastening hole during assemblage of the interior part with the screw, the dropped screw part can be caught by the tray section provided to the interior part, so that dropping of the screw part to a deeper position can be prevented.

Additionally, water fallen down into the interior part and entered the tray section may not collect there because the tray section has the opening through which the water can escape.

Further, when an impact load is applied to the interior part from outside the vehicle, cracks occur at the opening. As a result, the tray section can easily be broken, thus absorbing the impact.

In the second aspect of the invention, the opening is provided in plurality. As a result, a bolt can easily get caught in one of the openings. Also, drops of water can easily be discharged through the openings.

BRIEF DESCRIPTION OF DRAWINGS

FIG. 6 is a cross-sectional view taken along line 6-6 of FIG. 2.

FIG. 7 is a cross-sectional view taken along line 7-7 of FIG. 2.

MODE FOR CARRYING OUT THE INVENTION

Preferred embodiments of the present invention will be described in detail hereunder with reference to the accompanying drawings.

Description of Embodiments

Figure 1:
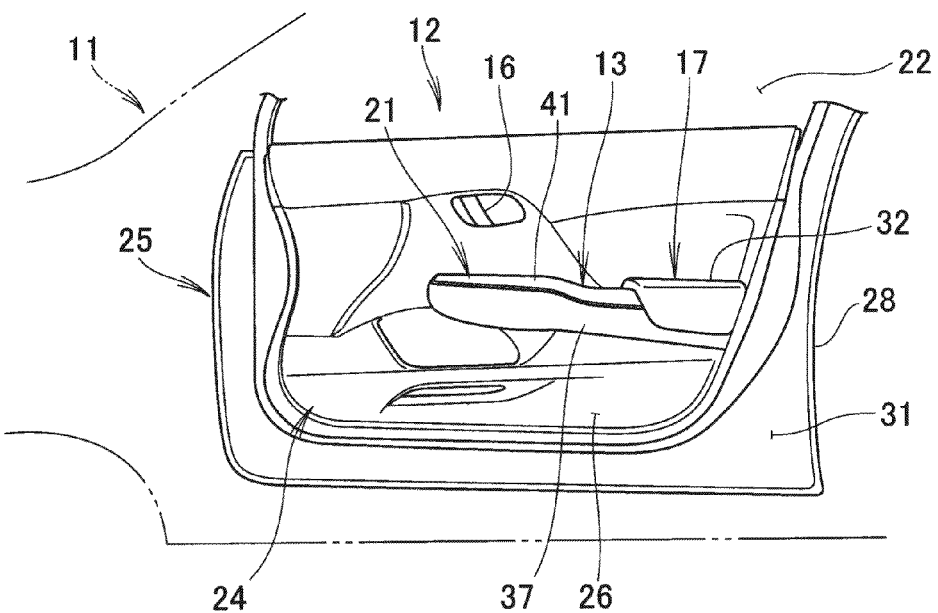
FIG. 1 is a side view of a door with an interior part, as seen from a passenger compartment, according to an embodiment of the present invention.
Figure 2:
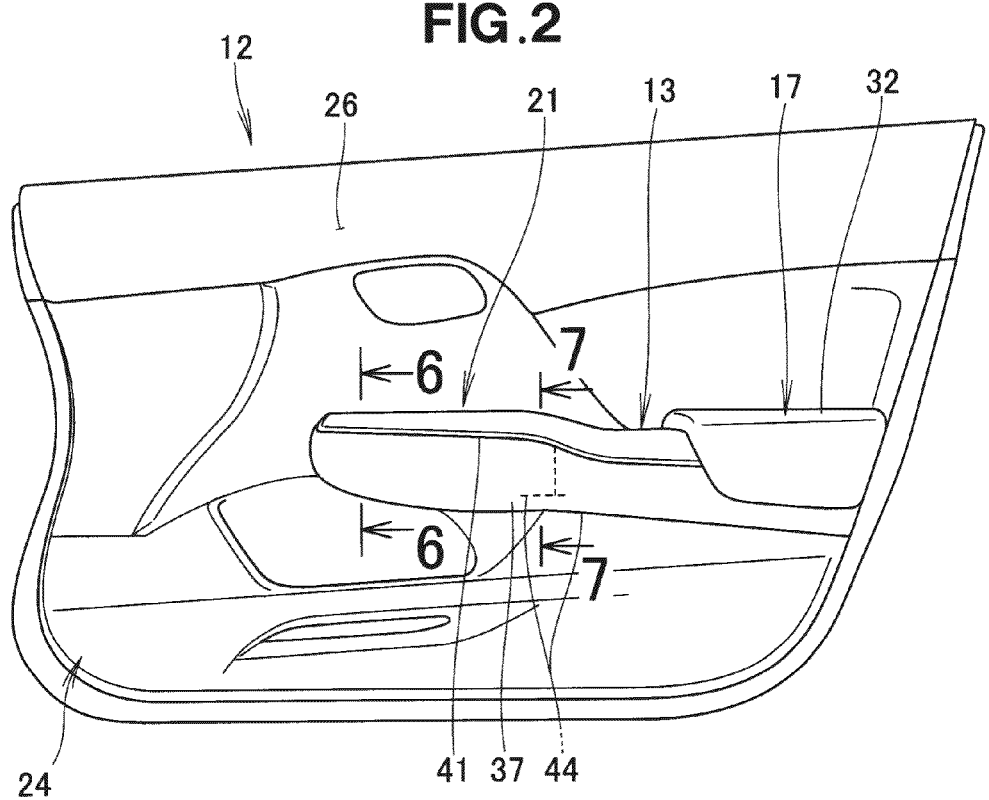
FIG. 2 is a side view of a door interior parts assembly shown in FIG. 1.
Figure 3:
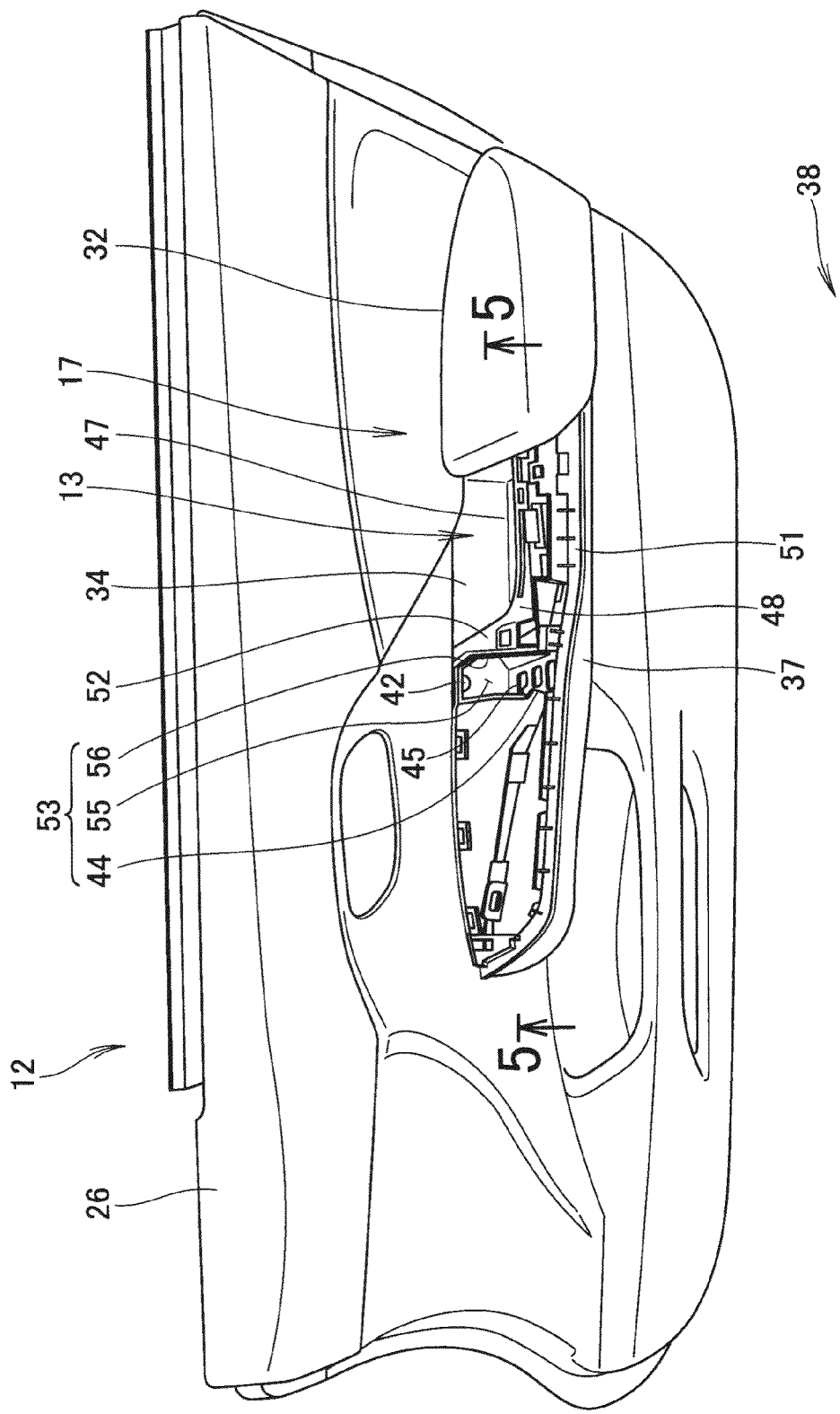
FIG. 3 is a perspective view of a door interior ornamental wall, with a cover removed.

FIGS. 1, 2 and 3 respectively show an interior part 13 provided within a vehicle body 11. A door 12 is a right front door which includes: a door opening lever 16; an armrest 17; and an operation panel 21 disposed on the armrest 17. In the operation panel 21, there are buttons provided for opening/closing a door glass 22 of a right front door 12 and a door glass 22 of a left front door (not shown).

The door 12 includes a sundries or door pocket as the interior part 13 provided to the armrest 17, and a loudspeaker disposition part 24. Attached to a door body 25 is a door interior ornamental wall 26. The door body 25 is comprised of an outer panel 28 and an inner panel 31. The door interior ornamental wall 26, the interior part 13 and the armrest 17 are secured to the inner panel 31.

Figure 4:
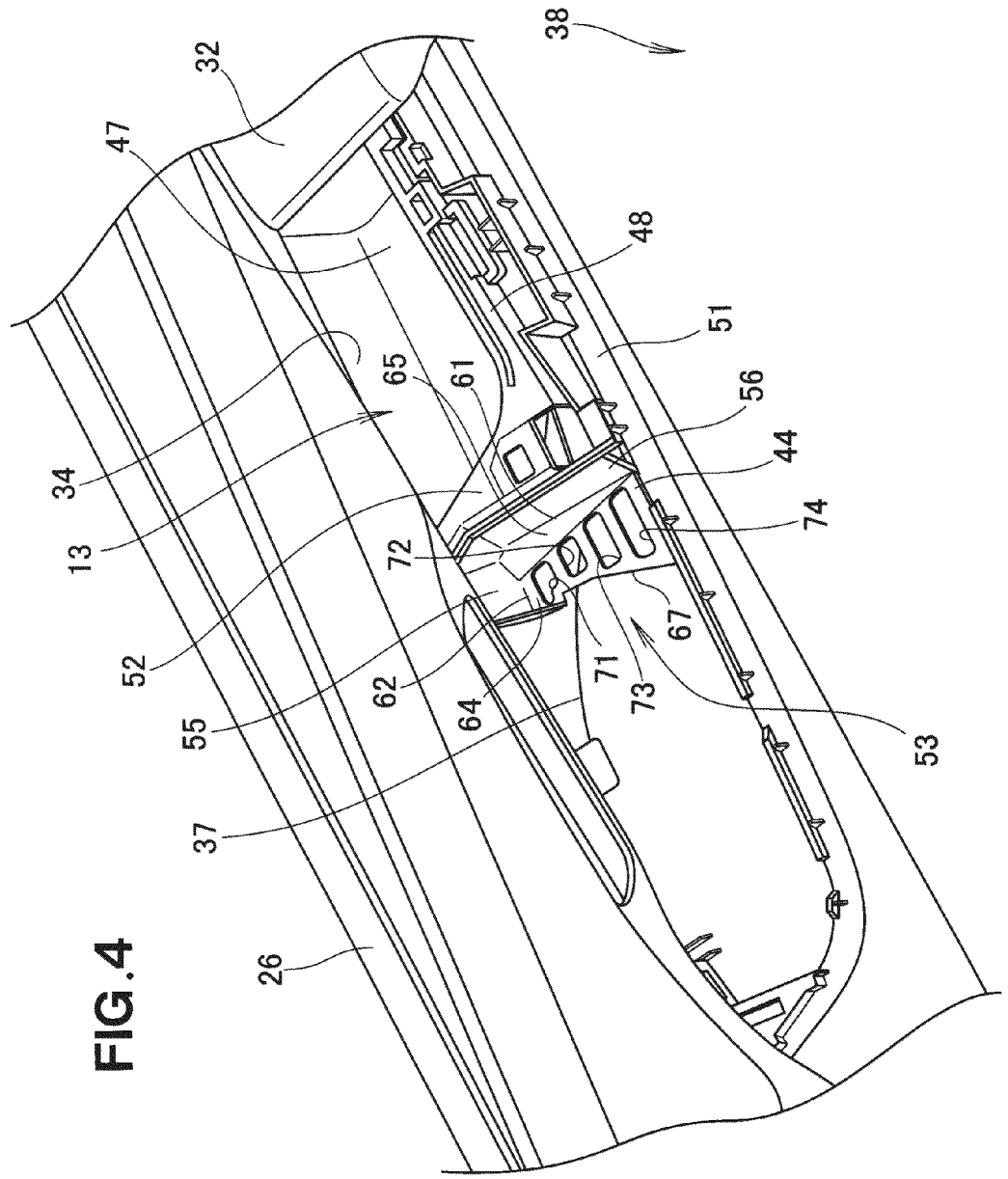
FIG. 4 is a perspective view of the interior part shown in FIG. 3.
Figure 5:
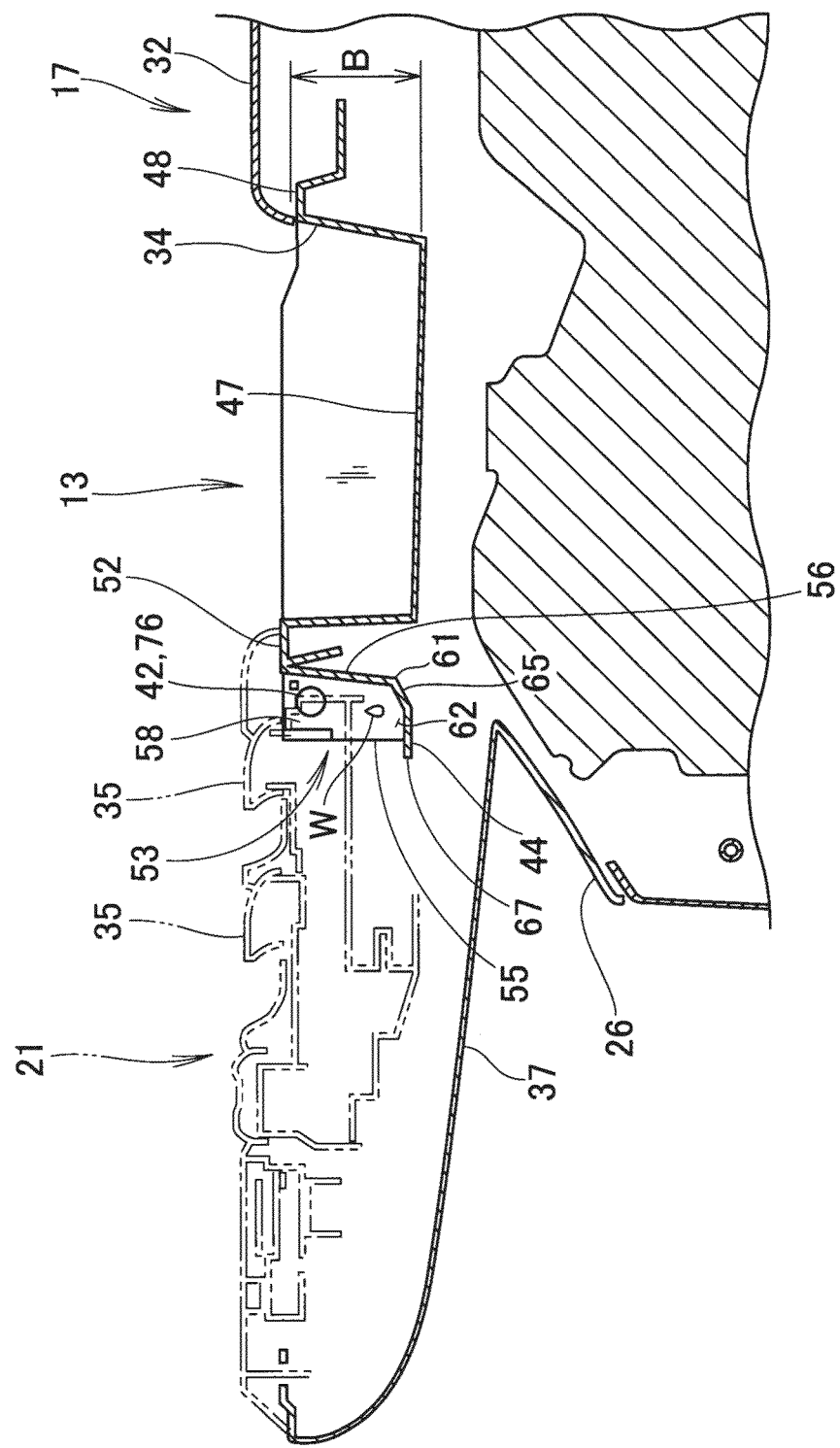
FIG. 5 is a cross-sectional view taken along line 5-5 of FIG. 3.

As shown in FIGS. 1 through 7, the armrest 17 protrudes from the door interior ornamental wall 26 (in the direction of arrow a1 of FIG. 6) and includes an armrest body portion 32 formed for allowing resting of a passenger's arm thereon. As shown in FIG. 5, the interior part (sundries pocket) 13 is disposed contiguously with the armrest body portion 32 and has an opening 34 that opens upwardly of the vehicle body 11. Further, the operation panel 21 being contiguous with the interior part 13 includes operating buttons 35 oriented upwardly of the vehicle body 11. The armrest 17 extends in a front-rear direction of the vehicle body 11.

As shown in FIGS. 5, 6 and 7, a base box portion 37 of the armrest 17 on which the interior part 13 and the operation panel 21 are placed protrudes toward a passenger compartment 38 from the door interior wall 26, as shown by arrow a1 A cover member 41 is attached onto the base box portion 37. A state in which the cover member 41 and the operation panel 21 are disassembled is shown in FIGS. 3 and 4. The cover member 41 is designed for covering the operation panel 21 and the interior part 13.

Structure of the interior part 13 will be described with reference to FIGS. 1 through 7. The interior part 13 is connected to the inner panel 31, that is, a fixation portion of the door 12.

As shown in FIG. 7, the interior part 13 includes a fastening hole 43 formed in order to allow passage of a shaft portion 42s of a screw part 42 therethrough to thereby fasten the interior part 13 to the inner panel 31. A tray section 44 is formed below the fastening hole 43. An opening 45 formed in the tray section 44 is sized not to permit a head portion 76 of the screw part 42 to pass therethrough. The opening 45 comprises a first opening 71, a second opening 72, a third opening 73 and a fourth opening 74.

As shown in FIG. 5, the interior part (sundries pocket) 13 has a box body 47 of square shape and a predetermined average depth B. A peripheral flange portion 48 contiguous with an edge of the box body 47 is attached to an upper edge 51 (FIG. 4) of the base box portion 37.

Continuously with a front peripheral flange portion 52 of the peripheral flange portion 48 that is directed toward the front of the vehicle body 11 and proximate to the operation panel 21, a fastening bracket 53 is provided externally of the box body 47.

As shown in FIGS. 5 and 7, the fastening bracket 53 is comprised of a fastening bracket body 55, a reinforcing bracket 56 and the tray section 44. The fastening bracket body 55 is in the form of plate disposed in opposed relation to the inner panel 31 of the door 12 and includes an upper part 58 located close to the front peripheral flange portion 52 and a fastening hole 43 formed in the latter.

Of the fastening bracket body 55, a sheet-shaped reinforcing bracket 56 is provided continuously with an edge proximate to the box body 47 and extends toward the passenger compartment 38 with surfaces oriented in a vehicle front-rear direction. The tray section 44 is integrally formed with a lower edge 61 of the reinforcing bracket 56 and a lower edge 62 of the fastening bracket body 55.

As shown in FIG. 7, the tray section 44 has a plate-like configuration. A first fixed end 64 of the tray section 44 is integrally connected to the lower edge 62 of the fastening bracket body 55 while a second fixed end 65 of the tray section 44 is integrally connected to the lower edge 61 of the reinforcing bracket 56 (FIG. 5). A distal end opposed to the first fixed distal end 64 is a first free distal end 66 free from being connected while a distal end opposite to the second fixed end 65 is a second free distal end 67 free from being connected, as shown in FIGS. 4 and 5.

The opening 45 formed in the tray section 44 is, as shown in FIG. 7, positioned close to the inner panel 31 of the door 12 and is comprised of a first opening 71, a second opening 72, a third opening 73 and a fourth opening 74 arranged in the mentioned order. The first opening 71 is positioned below the fastening hole 43 formed in the reinforcing bracket 56 while the second to fourth openings 72, 73 and 74 are formed in parallel to the first opening 71.

As shown in FIG. 4, the first opening 71 is an elongated hole extending in a front-rear direction of the vehicle body 11. The second opening 72, third opening 73 and fourth opening 74 are similarly elongated holes as the first opening 71, and all of these openings are situated proximate one another, as shown. The first opening 71, the second opening 72, the third opening 73 and the fourth opening 74 become progressively longer. Namely, the first opening 71 is the shortest while the fourth opening 74 is the longest. As shown in FIG. 7, the first opening 71 has a substantially constant width W1 sized such that although it will receive a shaft portion 42s of the screw part therein, it does not permit a head 76 of the screw part 42 to pass therethrough. The second, third and fourth openings 72, 73, 74 have the same width as that of the first opening 71 (W1=W2=W3=W4).

Figure 8:
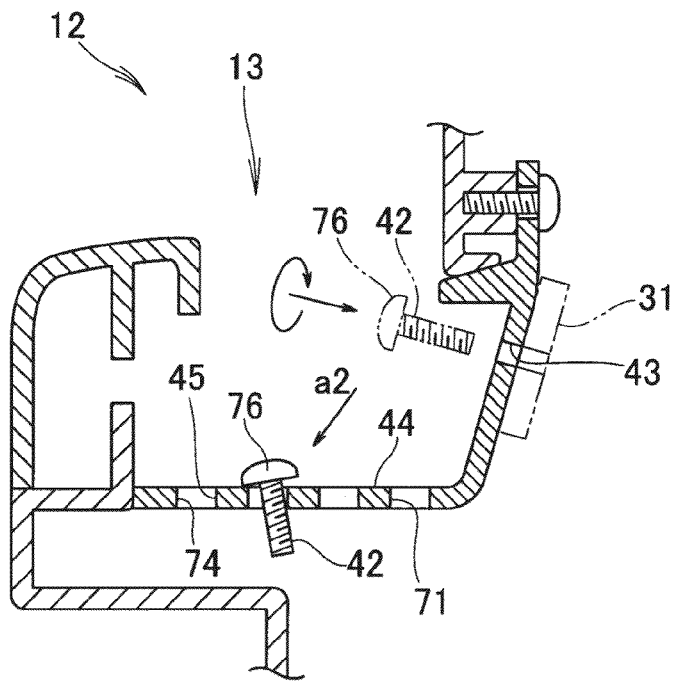
FIG. 8 is a cross-sectional view showing a state in which the interior part is fastened to an inner panel by a screw member.

Operation of how the screw member 42 is received by the interior part 13 will be described next with reference to FIG. 8. When the screw part 42 to be passed through the fastening hole 43 of the interior part 13 has been dropped, as shown by arrow a2, during assembling of the interior part 13 to the inner panel 31, the dropped screw part 42 is received or caught by the tray section 44.

Although the tray section 44 is provided with the first to fourth openings 71-74, those openings 71-74 (W1 to W4) are sized to be smaller than the head 76 of the screw part 42 so that the screw part 42 will never fall down through the openings 71 to 74.

The screw part 42 thus received by the tray section 44 would roll over the tray section 44 and get caught in any one of the openings 71 to 74, thereby providing the advantageous effect that the screw part 42 is prevented from dropping down from the tray section 44.

Figure 9:
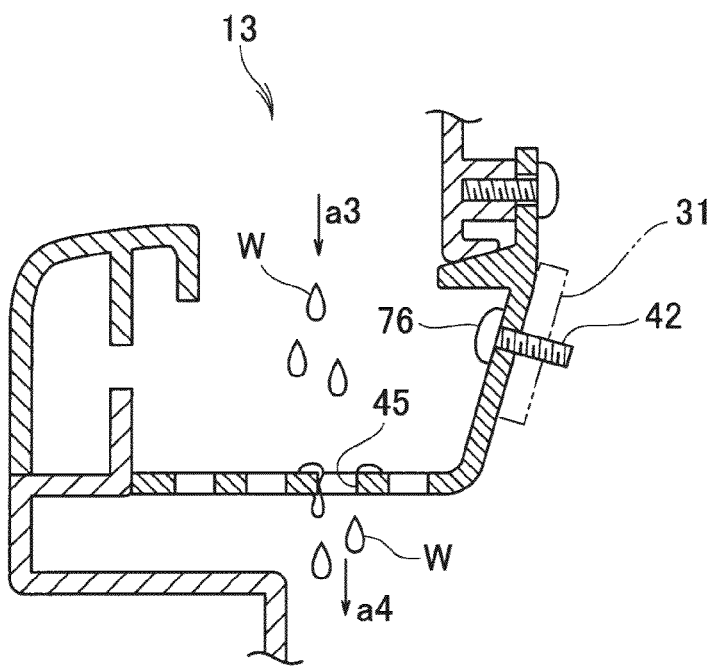
FIG. 9 is a cross-sectional view showing how water is discharged from the interior part shown in FIG. 8.

Next, drainage operation of the interior part 13 will be described with reference to FIG. 9. In the interior part (sundries pocket) 13, when water W (see also FIG. 5) enters into the interior part 13 through gaps around the buttons of the operation panel 21, as indicated by arrow a3, water W falls down onto the tray section 44. Water W moves further down through the openings 71 to 74, as indicated by arrow a4. Consequently, since water W would not collect and stay on the tray section 44, the operation panel 21 is, for example, free from being wet.

Figure 10:
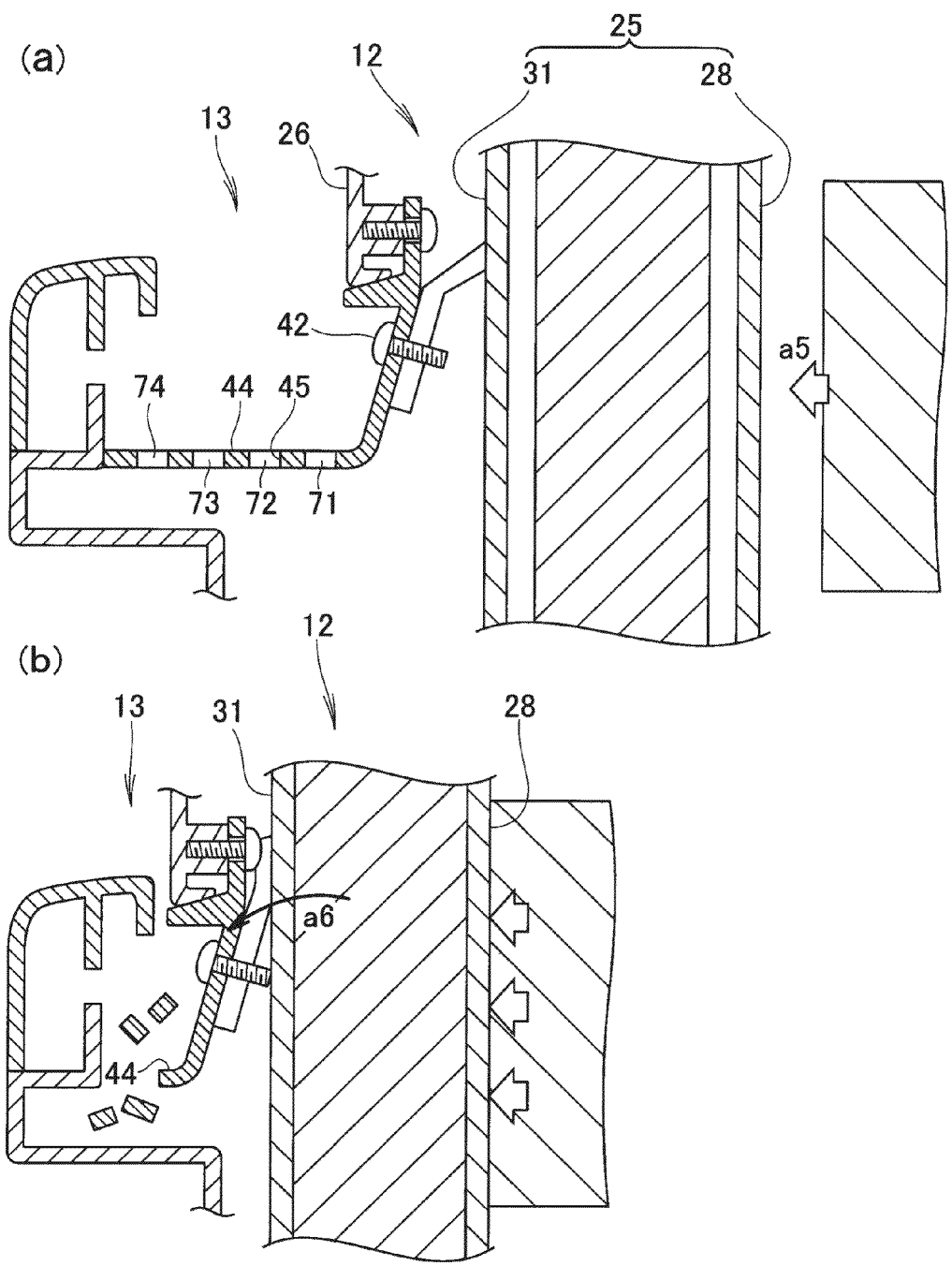
FIGS. 10(a) and (b) illustrate how the interior part absorbs an impact, FIG. 10 (a) being a cross-sectional view illustrating a state of the interior part before input of an impact load, FIG. 10 (b) being a cross-sectional view illustrating a state of the interior part after input of the impact load.

Next, shock absorption operation of the interior part 13 will be described with reference to FIG. 10. In the interior part 13, as shown in FIG. 10 (a), when a load acts on the door 12 from outside of the vehicle body 11, for example, a shock (or load) of a side collision is inputted into the door 12, as indicated by arrow a5, a compressed load acts on the interior part 13, as indicated by arrow a6 of FIG. 10 (b). When the load is inputted into the interior part 13, the load concentrates on the first opening 71 through the fourth opening 74 (FIG. 10 (a)) of the tray section 44. The tray section 44 with the openings thus formed can easily be crushed by an impact load, compared with a tray section with no openings formed therein, so that the tray section 44 can achieve a shock absorbing function as desired.

INDUSTRIAL APPLICABILITY

An interior part of the present invention is particularly suitable for application to a vehicle door.

REFERENCE SIGNS LIST

11 . . . vehicle body, 12 . . . vehicle body side (door), 13 . . . interior part, 31 . . . fixed portion (inner panel), 34 . . . opening, 42 . . . screw part, 43 . . . fastening hole, 44 . . . tray section, 45 . . . opening, 71 . . . first opening, 72 . . . second opening, 73 . . . third opening, 74 . . . fourth opening

The invention claimed is:

1. An interior part for use as a component of a vehicle armrest adapted to be attached to an inner panel of a vehicle door, said interior part comprising:
   a screw part for fastening the interior part to the inner panel, the screw part including a shaft portion and a head;
   a fastening bracket comprising:
      a fastening bracket body having a fastening hole formed therein to permit passage of the shaft portion of the screw part therethrough, the fastening bracket body being in the form of a plate and having a lower edge and a side edge extending vertically;
      a sheet-shaped reinforcing bracket provided continuously with the side edge of the fastening bracket body and extending toward a passenger compartment of the vehicle; and
      a tray section formed integrally with the lower edge of the fastening bracket body, and the lower edge of the reinforcing bracket, said tray section having a plurality of openings formed therein, wherein each of the openings is configured to have a size smaller than the screw part head so as not to allow passage of the screw part head therethrough.

2. The interior part of claim 1, wherein the openings are arranged parallel to each other, and each of the openings has substantially the same width.

3. The interior part of claim 1, wherein the openings are situated proximate one another, and each of the openings has a substantially constant width along the extent thereof.

4. The interior part of claim 1, wherein the openings are elongated holes formed parallel to one another and extending in the front-rear direction of the vehicle.

5. The interior part of claim 4, wherein one of the elongated holes, which is located closer to the fastening bracket body than another elongated hole, has a length shorter than a length of the other elongated hole.

\* \* \* \* \*